(12) United States Patent
Wong et al.

(10) Patent No.: US 8,467,301 B2
(45) Date of Patent: Jun. 18, 2013

(54) ROUTER MISCONFIGURATION DIAGNOSIS

(75) Inventors: Kam C. Wong, Ft. Collins, CO (US);
Peter C. Zwetkof, Ft. Collins, CO (US);
David M. Rhodes, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1138 days.

(21) Appl. No.: 11/446,914

(22) Filed: Jun. 5, 2006

(65) Prior Publication Data

US 2007/0280120 A1  Dec. 6, 2007

(51) Int. Cl.
*H04L 1/00* (2006.01)
(52) U.S. Cl.
USPC ............................ 370/242; 370/351; 709/220
(58) Field of Classification Search
USPC ................. 370/241, 242, 252, 351, 389, 392, 370/400; 709/223, 238
See application file for complete search history.

(56) References Cited

U.S. PATENT DOCUMENTS

| | | | | |
|---|---|---|---|---|
| 5,982,753 | A * | 11/1999 | Pendleton et al. | 370/252 |
| 6,292,472 | B1 * | 9/2001 | Rariden et al. | 370/254 |
| 6,393,486 | B1 * | 5/2002 | Pelavin et al. | 709/238 |
| 6,697,970 | B1 * | 2/2004 | Chisholm | 714/48 |
| 6,711,152 | B1 * | 3/2004 | Kalmanek et al. | 370/351 |
| 7,095,738 | B1 * | 8/2006 | Desanti | 370/389 |
| 7,106,740 | B1 * | 9/2006 | Leelanivas et al. | 370/392 |
| 7,155,500 | B2 * | 12/2006 | Nikander | 709/223 |
| 7,633,942 | B2 * | 12/2009 | Bearden et al. | 370/392 |
| 7,702,810 | B1 * | 4/2010 | Pan et al. | 709/242 |
| 2003/0023716 | A1 | 1/2003 | Loyd | |
| 2003/0037136 | A1 * | 2/2003 | Labovitz et al. | 709/224 |
| 2003/0211842 | A1 * | 11/2003 | Kempf et al. | 455/411 |
| 2004/0006619 | A1 * | 1/2004 | Syed et al. | 709/224 |
| 2004/0221025 | A1 | 11/2004 | Johnson et al. | |
| 2004/0221026 | A1 | 11/2004 | Dorland | |
| 2004/0221296 | A1 | 11/2004 | Ogielski et al. | |
| 2005/0083855 | A1 | 4/2005 | Natarajan et al. | |
| 2005/0102423 | A1 * | 5/2005 | Pelavin et al. | 709/238 |
| 2006/0092941 | A1 * | 5/2006 | Kusama | 370/392 |
| 2007/0058631 | A1 * | 3/2007 | Mortier et al. | 370/392 |
| 2007/0230482 | A1 * | 10/2007 | Shim et al. | 370/400 |
| 2008/0043633 | A1 * | 2/2008 | Padula et al. | 370/251 |
| 2008/0060082 | A1 * | 3/2008 | Matthews et al. | 726/27 |

OTHER PUBLICATIONS

EMC Corporation, "EMC Smarts Network Protocol Manager," Data Sheet S0002, May 2005.

* cited by examiner

*Primary Examiner* — Hassan Kizou
*Assistant Examiner* — Roberta A Shand

(57) ABSTRACT

Router misconfiguration diagnosis is disclosed. A notification of a routing failure between a first node and a second node is received. A first interface associated with the first node is identified, and a second interface associated with the second node is identified. A first management information value and a second management information value, specific to a routing protocol, are determined. Matching status is determined between the first and second management information values. A diagnostic message is generated responsive to the notification.

31 Claims, 6 Drawing Sheets

FIG. 7

ROUTER MISCONFIGURATION DIAGNOSIS

BACKGROUND

Routing protocols provide reachability information and network path preference information for transmission of data packets across communications networks. Routing protocols include, but are not limited to, routing protocol families such as Interior Gateway Protocol (IGP) and Exterior Gateway Protocol (EGP). Examples of IGP protocols include Intermediate-System to Intermediate-System (IS-IS), Open Shortest Path First (OSPF), and Enhanced Interior Gateway Routing Protocol (EIGRP). Examples of EGP protocols include Border Gateway Protocol (BGP) and BGP4.

Route listening technologies can monitor the data packets that flow between routers, using routing protocols. Route listening technologies are able to detect route failures and anomalies. Such technologies are able to provide near real-time reporting of routing symptoms that may indicate that a component of the communications network has gone awry.

In some cases, route failures are caused by physical network failures that are reported by a network monitoring service. However, route failures are often caused by a protocol miss configuration in a router. Troubleshooting in such cases typically requires manual comparison of protocol configuration values, and logging on to affected routers to perform a set of pertinent diagnostic commands. The process is time-consuming and requires expert protocol knowledge to evaluate a multitude of possible configuration mishaps. This may lead to protracted delays, and to high mean time to repair statistics.

Existing solutions are able to detect a misconfiguration by polling a router's Management Information Base (MIB) for a given network protocol, and are able to alert the user of the misconfiguration in an alarm. Such polling takes place periodically, such as at preset time intervals. However, since such polling requires an amount of time or a polling cycle to determine when an adverse routing condition occurs, there can be delays in detecting and reporting the misconfiguration. The speed at which a network can be polled may depend on a number of factors, including the number of nodes, the availability of bandwidth and the response times of those nodes. Since polling generally requires a relatively long cycle of time to gather data from a large number of devices, it is not always feasible to gather up-to-date information on routes in a large routed environment via polling. Polling also adds overhead to both network links and network system resources, thereby causing a negative impact on scalability.

BRIEF DESCRIPTION OF THE DRAWINGS

For the purpose of illustrating the invention, there is shown in the drawings a form that is presently exemplary; it being understood, however, that this invention is not limited to the precise arrangements and instrumentalities shown.

FIG. 7 shows an exemplary user interface for management software according to an embodiment of the invention.

DETAILED DESCRIPTION

Overview

Aspects of the present invention provide a tool which, used with a network management service having a route listening service, provides a network engineer with evidence, of what parameters, if any, are misconfigured for a reported route failure that is not explained by a physical network failure. The route failure causes the generation of a notification (e.g., a symptomatic alarm or trap). The tool can perform live Simple Network Management Protocol (SNMP) queries to a router identified in the notification, to obtain analysis information on its configuration values and states. The analysis can show what configuration parameters (i.e., management information values) are checked and can highlight any parameters that are misconfigured. In the event that no values are found to be misconfigured, the list of parameters and values that are checked can help the network engineer further narrow the possible cause of the problems. The mean time to repair such route failures can thereby be reduced.

An embodiment of the present invention can provide near real-time immediacy in alerting a network engineer of router failures, by using a routing analyzer (e.g., a route listening service) that monitors route traffic. Further aspects of the invention can identify the cause of a route failure as misconfiguration, providing accurate, specific details so that the network engineer can quickly correct the problem. Such details may, in some embodiments, include displaying all protocol configuration parameter-value pairs that have been checked, thereby providing information to help narrow down a problem whose cause may not be obvious.

Aspects of the invention provide enhanced accuracy in detecting route failures, compared to solutions that indirectly determine the health of the routing protocol layer based solely on the use of polling, or Simple Network Management Protocol (SNMP) traps, or syslog notifications. Authoritative information about a routing failure can be obtained by monitoring the network at its routing control plane, rather than at a higher-level network layer; accordingly, when monitoring of the routing control plane indicates there is a problem with routing, there is little doubt that a routing service is impaired.

Illustrative Computing Environment

Figure 1:
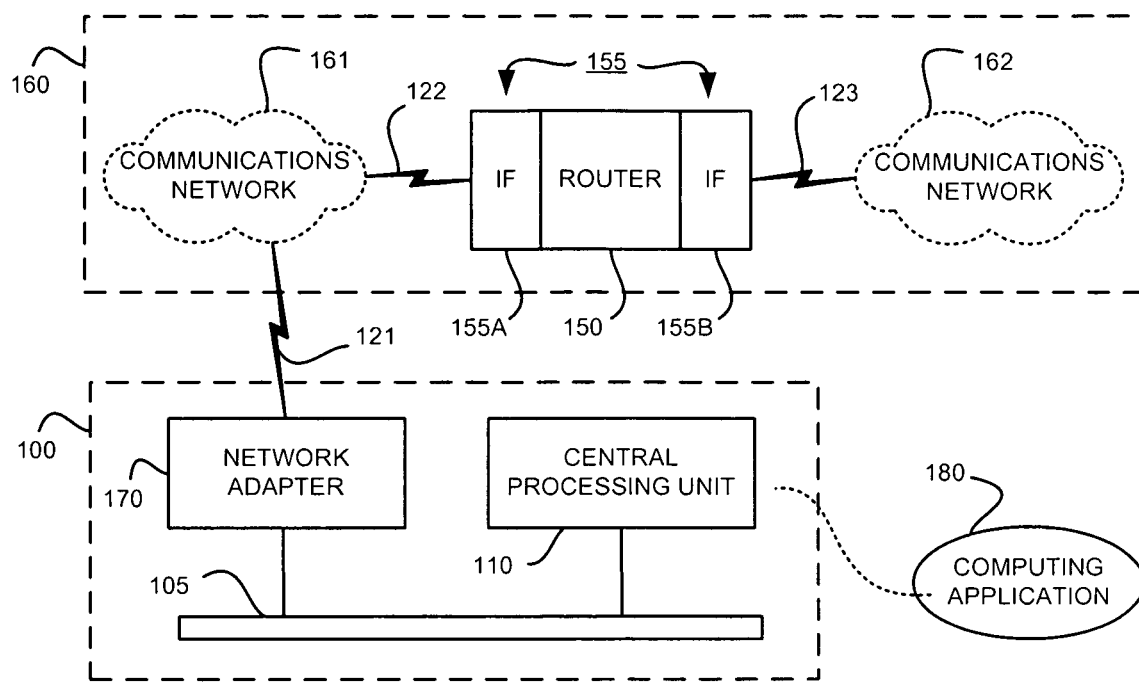
FIG. 1 is a block diagram of an exemplary computing environment in accordance with an implementation of the herein described systems and methods.

Referring to the drawings, in which like reference numerals indicate like elements, FIG. 1 depicts an exemplary computing system 100 for practicing aspects of the invention, in accordance with herein described systems and methods. The computing system 100 is capable of executing a variety of computing applications 180. Computing application 180 can comprise a computing application, a computing applet, a computing program and other instruction set operative on computing system 100 to perform at least one function, operation, and/or procedure. Exemplary computing system 100 is controlled primarily by computer readable instructions, which can be in the form of software. The computer readable instructions can contain instructions for computing system 100 for storing and accessing the computer readable instructions themselves. Such software can be executed within central processing unit (CPU) 110 to cause the computing system 100 to do work. In many known computer servers, workstations and personal computers CPU 110 is implemented by micro-electronic chips CPUs called microprocessors.

It is appreciated that although an illustrative computing environment is shown to comprise the single CPU 110 that such description is merely illustrative as computing environment 100 can comprise a number of CPUs 110. Additionally computing environment 100 can exploit the resources of remote CPUs (not shown) through communications network 160 or some other data communications means (not shown).

In operation, the CPU 110 fetches, decodes, and executes instructions, and transfers information to and from other resources via the computer's main data-transfer path, system bus 105. Such a system bus connects the components in the computing system 100 and defines the medium for data exchange. Components that can be connected to the system bus 105 include extension cards, controllers such as a peripherals controller and a memory controller, memory devices such as random access memory (RAM) and read only memory (ROM), and CPU 110.

Further, the computing system 100 can contain network adaptor 170 which can be used to connect the computing system 100 to an external communication network 160 by a communication link 121.

A communications network 160 may, for example, be any of, or a combination of a wired or wireless local area network (LAN), wide area network (WAN), intranet, extranet, peer-to-peer network, the Internet, or other communications network. In an exemplary embodiment, the communications network 160 can comprise two or more subnetworks such as communications networks 161, 162 interconnected by one or more routers 150. The router 150 has interfaces (IFs) 155A, 155B (collectively, interfaces 155), through which the router 150 interconnects communications networks 161, 162 by communication links 122, 123. While the exemplary router 150 shown in FIG. 1 has two interfaces 155A, 155B, a router 150 is not limited to two interfaces 155, and can have one or more interfaces 155.

The communications networks 160-162 can provide computer users with connections for communicating and transferring software and information electronically. Additionally, communications networks 160-162 can provide distributed processing, which involves several computers and the sharing of workloads or cooperative efforts in performing a task. Communication links 121-123 may, for example, include wired connections, wireless connections, optical connections, and the like. It will be appreciated that the network connections shown are exemplary and other means of establishing a communication link between computers may be used.

A router 150, in general, can be defined as a network device (which in some embodiments can comprise a dedicated computer 100) that is used to connect two or more communication networks 161, 162 together and to route data packets between them. Router 150 is configured to determine a path for forwarding the data packets, and can be adapted to use a protocol to communicate with other routers 150; examples of such protocols include, but are not limited to, Internet Control Message Protocol (ICMP) and routing protocols such as Open Shortest Path First (OSPF). Router 150 is able to directly receive data packets over a communication network 161, 162 from one or more adjacent nodes (such as computing system 100, other computing systems 100, other routers 150, and other network devices). Router 150 can be configured to determine an optimum route between two nodes.

It is appreciated that the exemplary computer system 100 is merely illustrative of a computing environment in which the herein described systems and methods may operate and does not limit the implementation of the herein described systems and methods in computing environments having differing components and configurations as the inventive concepts described herein may be implemented in various computing environments having various components and configurations.

Illustrative Computer Network Environment

Figure 2:
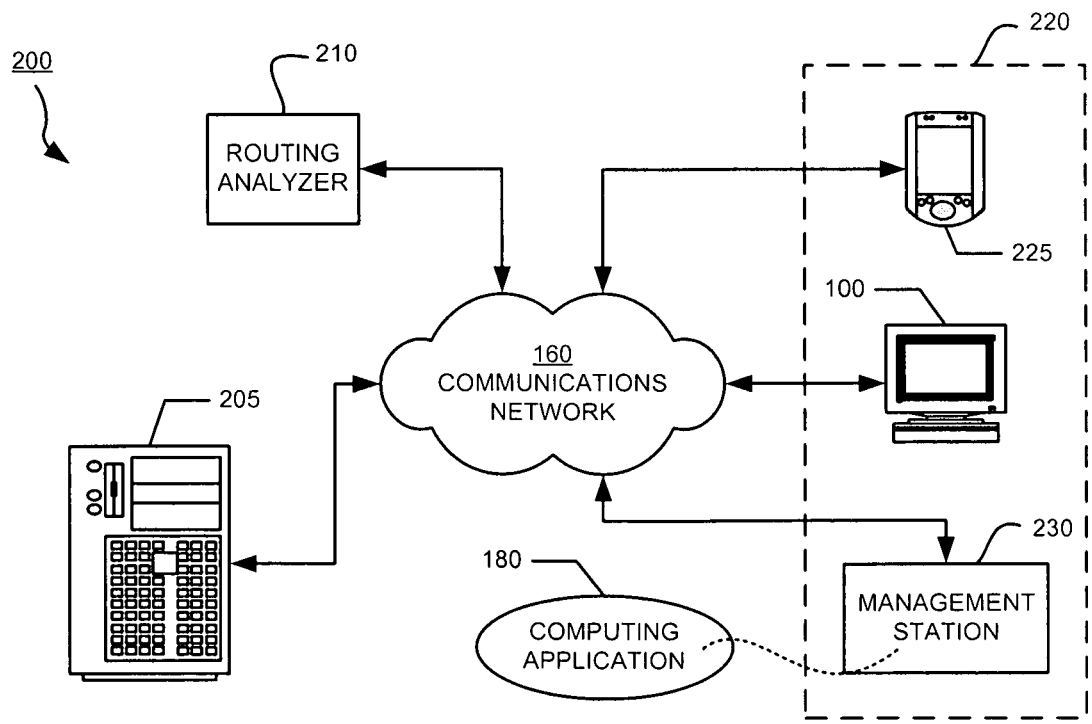
FIG. 2 is a block diagram showing the cooperation of exemplary components of an exemplary data communications architecture, in accordance with an embodiment.

Computing system 100, described above, can be deployed as part of a computer network. In general, the above description for computing environments applies to both server computers and client computers deployed in a network environment. FIG. 2 illustrates an illustrative networked computing environment 200, with a server in communication with client computers via a communications network, in which the herein described apparatus and methods may be employed. While an exemplary client-server system is illustrated in FIG. 2, any of numerous configurations may be used with aspects of the invention, including peer-to-peer and other network configurations.

In a network environment 200 in which the communications network 160 is the Internet, for example, server 205 can be one or more dedicated computing environment servers operable to process and communicate data to and from exemplary client computing environments 220. In some embodiments of the network environment 200, numerous computing systems 100 can be connected to the communications network 160, and a particular computing system 100 may function as a server 205, as a client 220, or as both. In operation, a user (not shown), such as a network engineer, may interact with a computing application running on a client computing environment 220 to obtain desired data and/or computing applications. The data and/or computing applications may be stored on server computing environment 205 and communicated to cooperating users through exemplary client computing environments 220, over exemplary communications network 160.

As shown in FIG. 2, server 205 may be interconnected via a communications network 160 (which may be any of, or a combination of, a wired or wireless LAN, WAN, intranet, extranet, peer-to-peer network, the Internet, or other communications network) with a number of exemplary client computing environments such as computing system 100, personal digital assistant 225, wired or mobile telephone (not shown), networked storage devices, printing devices, and other network appliances (not shown), and management station 230 (collectively, client computing environments 220). Server 205, client computing environments 220, and a routing analyzer 210 are connected with communications network 160 (such as by a communication link 121).

The management station 230 is operable to monitor nodes of the communications network 160; for example, management station 230 can monitor a protocol (e.g., Internet Protocol (IP)) used in the communications network 160. In some embodiments, management station 230 comprises a computing system 100 equipped with a computing application 180 such as network management software for monitoring devices connected to the communications network 160.

Illustrative Data Flow

Figure 3:
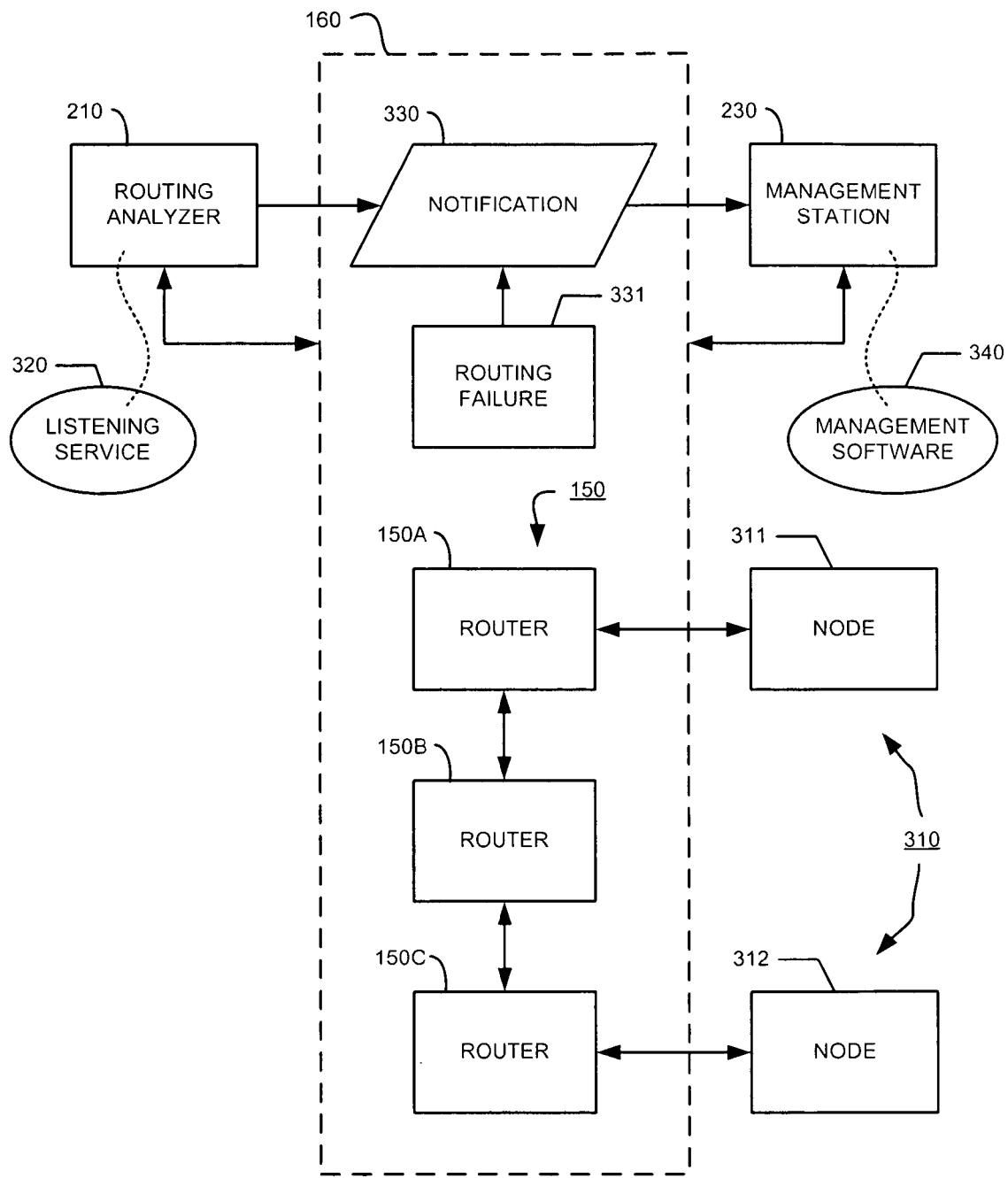
FIG. 3 is a diagram illustrating transmission of a notification from an exemplary routing analyzer to an exemplary management station, in a network environment for practicing an embodiment of the invention.

FIG. 3 is a diagram illustrating transmission of a notification 330 from an exemplary routing analyzer 210 to an exemplary management station 230, in a network environment for practicing an embodiment of the invention, in accordance with an embodiment.

The routing analyzer 210 is operable to provide a route listening service 320 for monitoring the communications network 160. Routing analyzer 210 can be, for example, a network appliance such as Route Explorer, commercially available from Packet Design Inc., or OpenView Route Analytics Management System (RAMS), commercially available from Hewlett-Packard Company. Routing analyzer 210 is operable to monitor a routing protocol used in the communications network 160. Routing protocols include, but are not limited to, routing protocol families such as Interior Gateway Protocol (IGP) and Exterior Gateway Protocol (EGP). Examples of IGP protocols include Intermediate-System to Intermediate-System (IS-IS), Open Shortest Path First (OSPF), Enhanced Interior Gateway Routing Protocol (EIGRP), and the like. Examples of EGP protocols include Border Gateway Protocol (BGP), BGP4, and the like. Routing analyzer 210 (for example, a route analysis appliance) is able to detect events (such as routing failure 331) on the communications network 160, and is able to generate notifications (e.g., asynchronous event reports, or traps) for reporting events over the communications network 160.

The communications network 160 comprises a plurality of routers 150 (e.g., routers 150A, 150B, 150C), which connect a plurality of nodes 310 (e.g., nodes 311, 312). Exemplary nodes 310 may include one or more of computing system 100, server 205, client computing environment 220, or any network-connected system, device, appliance, or the like.

Using the listening service 320 for monitoring the communications network 160, the routing analyzer 210 is able to detect a routing protocol failure condition of one or more of the routers 150; for example, routing failure 331. In an illustrative example of routing failure 331, packets are dropped and not advertised. A further example of routing failure 331 is lost adjacency; e.g., loss of adjacency between two of the routers 150 or between two of the nodes 310. Routing analyzer 210 generates notification 330, such as by using SNMP to generate a trap which is transmitted over communications network 160.

Management station 230 is able to receive the notification 330 over communications network 160. Management station 230 is equipped with network management software 340 for monitoring devices connected to the communications network 160. Network management software 340 may, for example, send and receive network messages, e.g., by using Simple Network Management Protocol (SNMP). The management station 230 is able to receive a notification 330, such as a notification 330 generated by the routing analyzer 210 or by a router 150. Management station 230 is also able to interact with a user (not shown), such as a network engineer, by displaying information to the user and receiving inputs from the user. In an illustrative example, web browsing software can be provided on management station 230 to provide interactivity with the user. In a further illustrative example, network management software 340 may be configured to provide interactivity with the user.

Exemplary Data Elements

Figure 4A:
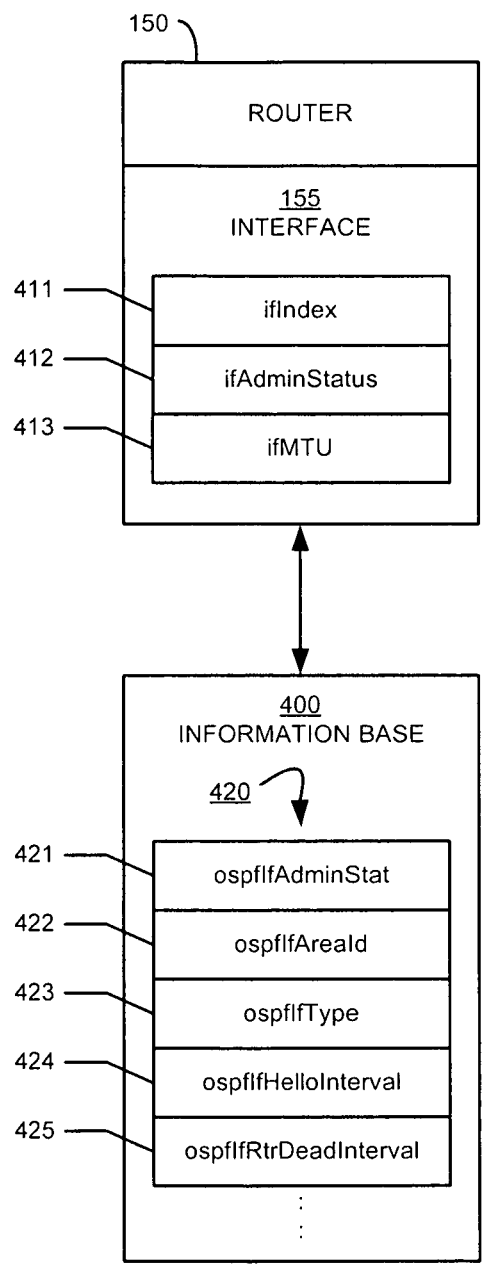
FIG. 4A is a diagram illustrating an interface having a management information base for practicing an embodiment of the invention.

FIG. 4A is a diagram illustrating an interface 155 having a management information base 400 for practicing an embodiment of the invention. An exemplary router 150 has an interface 155, for connecting the router 150 to a communications network 160. The interface 155 is associated with data elements for describing aspects of the interface 155; for example, an interface index 411 (ifIndex), an interface administrative status 412 (ifAdminStatus), and an interface maximum transmission unit size 413 (ifMTU) that represents the maximum amount of data (e.g., packet size) that can be transferred in one physical frame. For example, the data elements 411-413 may, in some embodiments, be included as entries in an interface table. In further exemplary embodiments, data elements 411-413 may be included in management information base 400.

Management information base 400 (MIB) is associated with the interface 155. The management information base 400 comprises a plurality of management information values 420. In an illustrative example, the management information base 400 comprises an OSPF interface table, and the OSPF interface table includes entries (such as management information values 420) associated with the OSPF routing protocol.

Illustrative examples of management information values 420 include an OSPF interface administrative status 421 (ospfIfAdminStat), an OSPF interface area identifier 422 (ospfIfAreaId), an OSPF interface type 423 (ospfIfType), an OSPF interface hello interval value 424 (ospfIfHelloInterval), and an OSPF interface router dead interval value 425 (ospfIfRtrDeadInterval). The OSPF interface administrative status 421 (ospfIfAdminStat) may, for example, have a value representing an enabled status, or a disabled status. The OSPF interface area identifier 422 may, for example, be a 32-bit integer uniquely identifying the area to which the interface 155 connects. The OSPF interface type 423 may, for example, have a value representing broadcast LANs (e.g., Ethernet and IEEE 802.5), a value representing X.25 and similar technologies, and values representing links that are point-to-point, or point-to-multipoint. The OSPF interface hello interval value 424 may, for example, represent a length of time, in seconds, between "Hello" packets that the router 150 sends on the interface 155. The OSPF interface router dead interval value 425 may, for example, represent a number of seconds that the router 150's "Hello" packets have not been seen before neighboring routers 150 declare the adjacency between themselves and router 150 to be down.

Figure 4B:
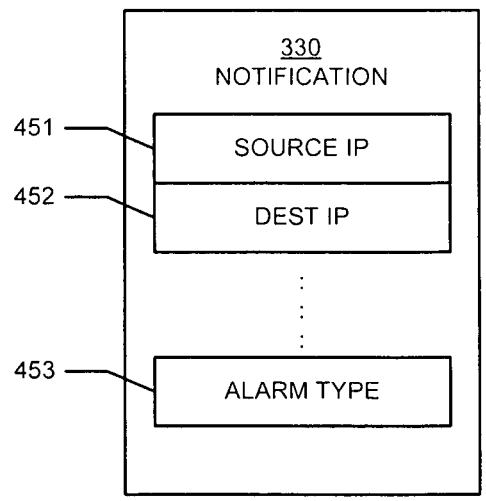
FIG. 4B depicts an illustrative notification, according to an embodiment of the invention.

FIG. 4B depicts an illustrative notification 330, according to an embodiment of the invention. The notification 330 comprises a plurality of data elements. Source IP address 451 is a data element comprising a first IP address for a source node 310 (e.g., first node 311). Destination IP address 452 is a data element comprising a second IP address for a destination node 310 (e.g., second node 312). Alarm type 453 is a data element comprising an identifier (e.g., a numeric value, text, enumerator, constant, or the like) representing a purpose or subject matter of the notification. For example, alarm type 453 may comprise an identifier that indicates lost adjacency between source IP address 451 and destination IP address 452.

First Exemplary Method

Figure 5:
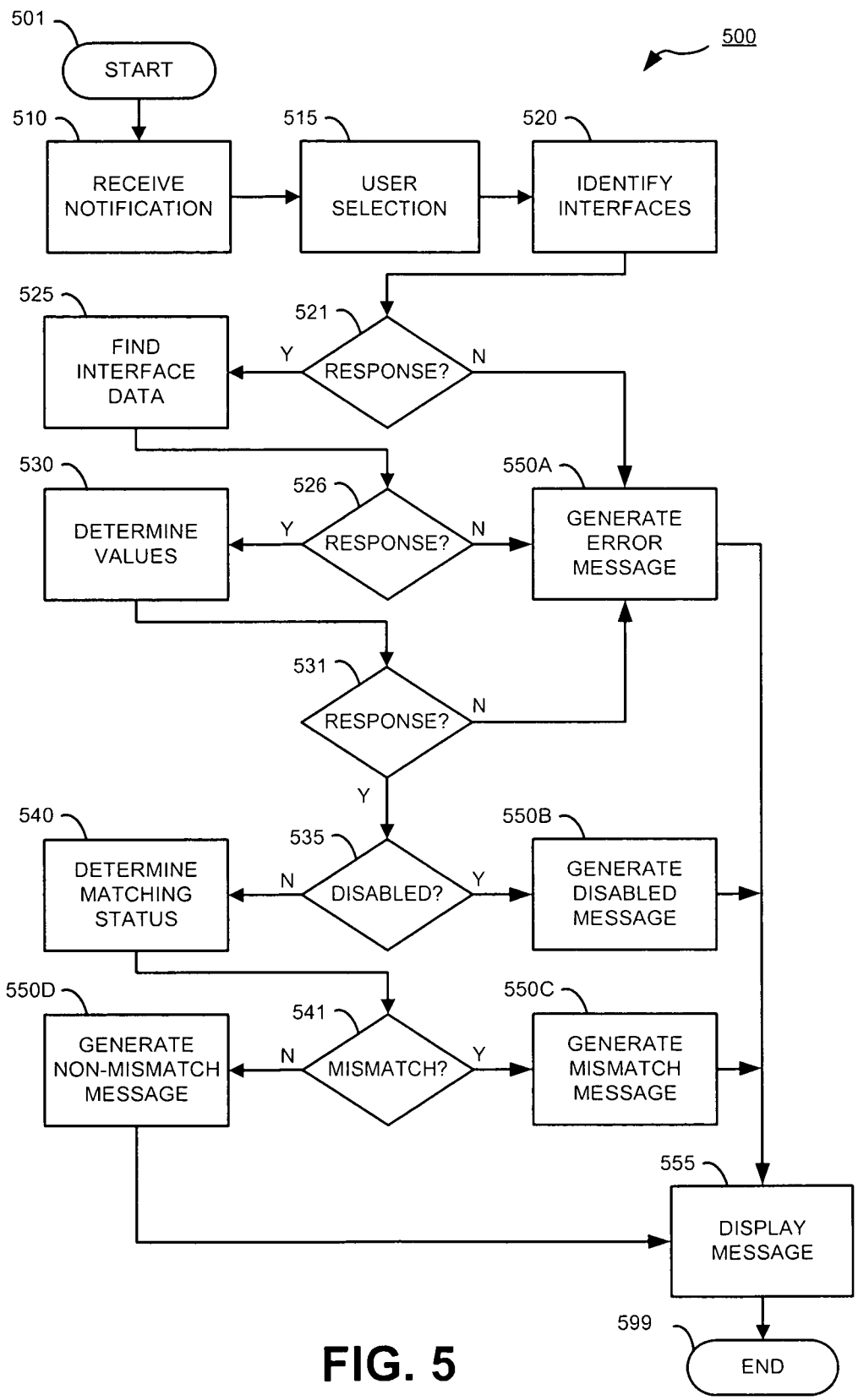
FIG. 5 is a flow chart of a first exemplary method for router misconfiguration diagnosis according to an embodiment of the present invention.

FIG. 5 shows a first exemplary method 500 for router misconfiguration diagnosis according to an embodiment of the present invention. The method 500 begins at start block 501, and proceeds to block 510. At block 510, a notification 330 of a routing failure 331 (e.g., lost adjacency) between a first node 311 and a second node 312 is received, such as by management software 340 running on management station 230.

Figure 7:
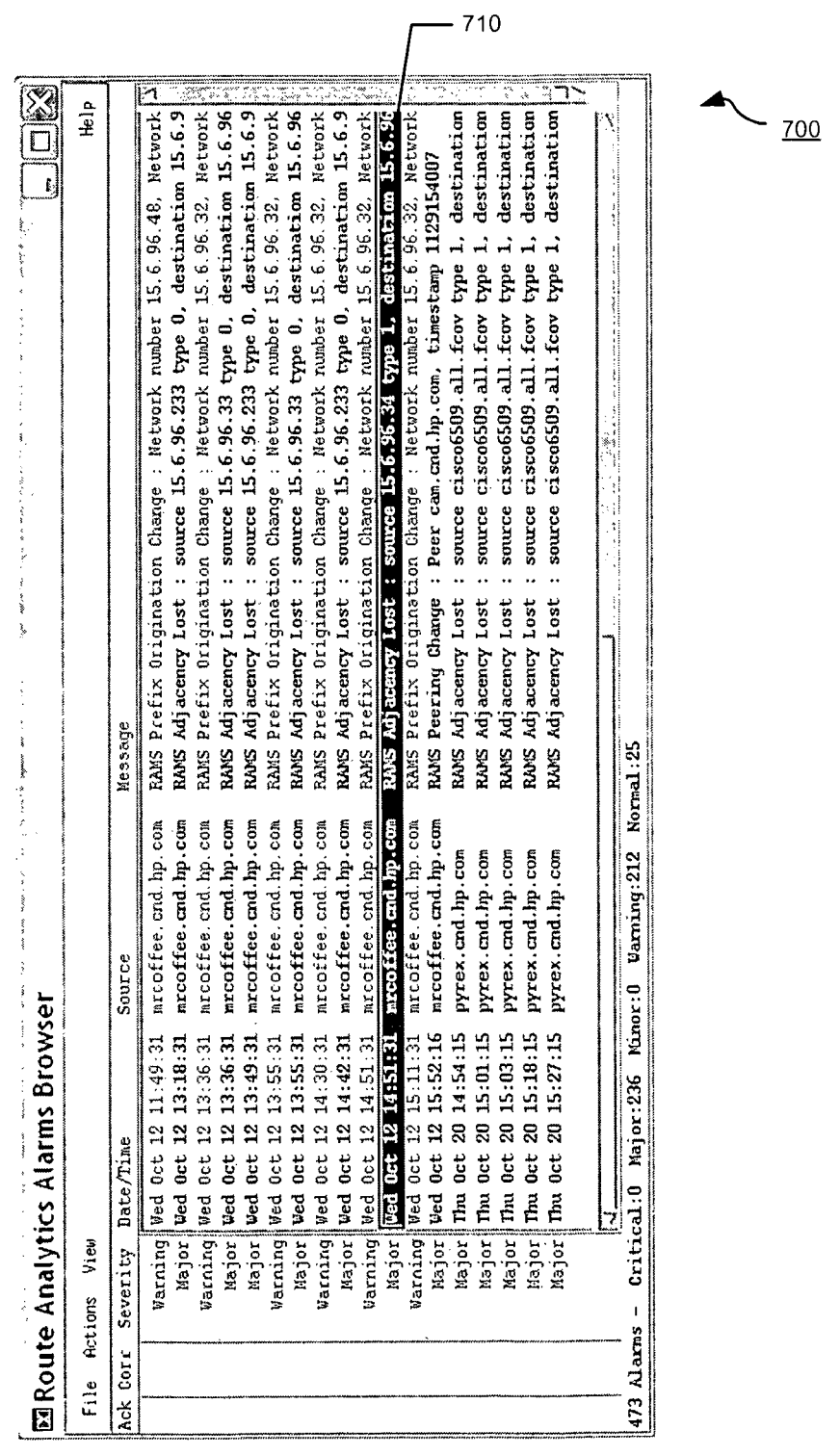

At block 515, a user selection is made, thereby causing the management software 340 to undertake or launch a diagnostic routine (e.g., routing protocol diagnosis) for the routing failure 331. In an illustrative example, a user at management station 230 may select a representation 710 of the notification 330 (e.g., a lost adjacency alarm) from a user interface 700 (e.g., web application, menu, browser, screen, or other interface) of the management software 340. An example of such a representation 710 is illustrated in FIG. 7, discussed below.

At block 520, a first interface 155 associated with the first node 311 is identified, and a second interface 155 associated with the second node 312 is identified. In an illustrative example, the identification is accomplished by extracting a source IP address 451 and a destination IP address 452 from the notification 330. In a further illustrative example, two instances of an interface index 411 associated with the first and second interfaces 155 are then determined; for instance, one or more SNMP queries are initiated to find the value of an interface index 411 for the first interface 155 at source IP address 451, and to find the value of an interface index 411 for the second interface 155 at the destination IP address 452.

SNMP queries, together with diagnostic steps, may, for example, be encoded in an executable file, or in some embodiments, may be encoded in a Perl script for enhanced platform portability, re-use of tools, customizability, and reasonably fast prototyping turnaround.

At block 521, a check takes place, evaluating the response, if any, to the SNMP query or queries of block 520. If there was an error or no response, the method 500 proceeds to block 550A, discussed below. In some embodiments, if there was a valid response, the values returned from the SNMP query or queries may be saved into a table. If there was a valid response, the method 500 proceeds to block 525.

At block 525, interface data is found. In an illustrative example, using the value of an interface index 411 for the source IP address 451, one or more data elements 412-413 associated with the first interface 155 for the source IP address 451 are determined. For instance, one or more SNMP queries are initiated to find the value of an ifAdminStatus 412 and an ifMTU 413 for the first interface 155. Continuing the same illustrative example, using the value of an interface index 411 for the destination IP address 452, one or more data elements 412-413 associated with the second interface 155 at the destination IP address 452 are determined. For instance, one or more SNMP queries are initiated to find the value of an ifAdminStatus 412 and an ifMTU 413 for the second interface 155.

At block 526, a check takes place, evaluating the response, if any, to the SNMP query or queries of block 525. If there was an error or no response, the method 500 proceeds to block 550A, discussed below. In some embodiments, if there was a valid response, the values returned from the SNMP query or queries may be saved into a table. If there was a valid response, the method 500 proceeds to block 530.

At block 530, a first management information value 420 for the first interface 155 and a second management information value 420 for the second interface 155 are determined. The determination is made using queries that are specific to a routing protocol; for example, SNMP queries to the MIB 400 associated with the OSPF routing protocol. In an illustrative example, SNMP queries may be used to retrieve the relevant set of management information values 420 from a MIB 400 associated with router 150.

In an illustrative embodiment, the first management information value 420 is the OSPF interface administrative status 421 for the first interface 155 (e.g., the source interface), and the second management information value 420 is the OSPF interface administrative status 421 for the second interface 155 (e.g., the destination interface). The value of ospfIfAdminStat 421 may, for example, indicate an enabled status, or a disabled status.

In some embodiments, additional management information values 420 are determined for the first and second interfaces 155. For example, management information values 420 may also be determined for an OSPF interface area identifier 422 (ospfIfAreaId), an OSPF interface type 423 (ospfIfType), an OSPF interface hello interval value 424 (ospfIfHelloInterval), and an OSPF interface router dead interval value 425 (ospfIfRtrDeadInterval).

At block 531, a check takes place, evaluating the response, if any, to the SNMP query or queries of block 530. If there was an error or no response, the method 500 proceeds to block 550A, discussed below. In some embodiments, if there was a valid response, the values returned from the SNMP query or queries may be saved into a table. If there was a valid response, the method 500 proceeds to block 535.

At block 535, the interface status (such as the value of ospfIfAdminStat 421) is checked for the first and second interfaces 155. Each value of ospfIfAdminStat 421 may, for example, indicate an enabled status, or a disabled status. If the ospfIfAdminStat 421 for the first interface 155 is disabled, or if the ospfIfAdminStat 421 for the second interface 155 is disabled, or both, the method 500 proceeds to block 550B, discussed below. If neither is disabled, the method 500 proceeds to block 540.

At block 540, for the values of management information value 420 previously determined, a matching status is determined between the first management information value 420 for the first (source) interface 155 and the corresponding second management information value 420 for the second (destination) interface 155. For example, for pairs of corresponding management information values 420, a mismatch may be identified between the two management information values 420, or a match may be identified.

At block 541, the matching status is checked. If one or more mismatches were identified at block 540, the method 500 proceeds to block 550C, discussed below. If no mismatches were identified at block 540, the method 500 proceeds to block 550D, discussed below.

At block 550A, an error message is generated; for example, a message may be generated with error text returned from the SNMP query or queries. An illustrative example of such an error message is shown in Table 1.

TABLE 1

RAMS Protocol Diagnosis : "AdjacencyLost" "15.6.96.34" "15.6.96.33"

RAMS Protocol Diagnosis Results
Diagnosing AdjacencyLost related symptoms between source 15.6.96.34 and destination 15.6.96.33
Unable to proceed with diagnosis on 15.6.96.34.
  snmpget: No response arrived before timeout.
  snmpget: Possible causes include invalid community name, agent is not running, or the node is unaccessible.
Unable to proceed with diagnosis on 15.6.96.33.
  snmpget: No response arrived before timeout.
  snmpget: Possible causes include invalid community name, agent is not running, or the node is unaccessible.
  Probable cause:
  network failure.
  Check if any APA events are correlated under this Adjacency Lost.

In some embodiments, in the event of no response to a SNMP query, the error message may advise the user to check for events (e.g., APA events) that may indicate physical failure of a device. The method 500 proceeds to block 555.

At block 550B, an error message is generated, responsive to the notification 330, indicating that a routing protocol (e.g., OSPF) is disabled for one or both of the interfaces 155, and identifying the disabled interface(s) 155. An illustrative example of such an error message is shown in Table 2. The method 500 proceeds to block 555.

TABLE 2

RAMS Protocol Diagnosis : "AdjacencyLost" "15.6.96.50" "15.6.96.49"

RAMS Protocol Diagnosis Results
Diagnosing AdjacencyLost related symptoms between source 15.6.96.50
and destination 15.6.96.49
Found values configured for ip 15.6.96.49 :
    ospfIfAdminStat = 2
    ospfIfAreaId = 0.0.0.0
    ospfIfType = 1
    ospfIfHelloInterval = 10
    ospfIfRtrDeadInterval = 40
Probable cause:
    IP Address 15.6.96.49 is disabled (ospfIfAdminStat = 2) for OSPF
(IGP) protocol.
Check OSPF configuration for the IP Address on the router.

At block 550C, a message is generated, responsive to the notification 330, indicating that a mismatch or misconfiguration has been found, and identifying the mismatched data elements 411-413 and/or management information values 420. In an illustrative example, the message may, in some embodiments, include a table or display identifying the data elements 411-413 and/or management information values 420 that were queried, together with the corresponding values thereof. An illustrative example of such an error message is shown in Table 3. The method 500 proceeds to block 555.

TABLE 3

RAMS Protocol Diagnosis : "AdjacencyLost" "15.6.96.49" "15.6.96.50"

RAMS Protocol Diagnosis Results
Diagnosing AdjacencyLost related symptoms between source 15.6.96.49
and destination 15.6.96.50
  Probable cause:
  Mismatched protocol value(s) configured between source 15.6.96.49
and destination 15.6.96.50 :
    source ospfIfHelloInterval value = 15
    destination ospfIfHelloInterval value = 10
    source ospfIfRtrDeadInterval value = 60
    destination ospfIfRtrDeadInterval value = 40

At block 550D, a diagnostic message is generated responsive to the notification 330; for example, a message indicating that no mismatch or misconfiguration has been found. The message may, in some embodiments, include a table or display identifying the data elements 411-413 and/or management information values 420 that were queried, together with the corresponding values thereof. The method 500 proceeds to block 555. An illustrative example of such an error message is shown in Table 4.

TABLE 4

RAMS Protocol Diagnosis : "AdjacencyLost" "15.6.96.49" "15.6.96.50"

RAMS Protocol Diagnosis Results
Diagnosing AdjacencyLost related symptoms between source 15.6.96.49
and destination 15.6.96.50
Cannot determine probable cause - no mismatched configuration found
between routers.
Values configured for
  source IP Address 15.6.96.49 : destination IP Address 15.6.96.50

| | | | | |
|---|---|---|---|---|
| | IpIfAdminStatus | up | : | up |
| | IpIfMtu | 1500 | : | 1500 |
| OSPF | IfIpAdminStat | 1 | : | 1 |
| OSPF | IfAreaId | 0.0.0.1 | : | 0.0.0.1 |
| OSPF | IfType | 1 | : | 1 |
| OSPF | IfHelloInterval | 10 | : | 10 |
| OSPF | IfRouterDeadInterval | 40 | : | 40 |

At block 555, the message generated at any of blocks 550A-550D (e.g., an error message or diagnostic message) is displayed to the user; for example, by a web browser page or a pop-up window displaying the error message. For example, in some embodiments, a tool (such as webappmon) can be used to invoke a diagnostic script, to capture the standard output of its results, and to display the output as a web page to the user. From block 555, the method 500 concludes at block 599.

Simplified Exemplary Method

Figure 6:
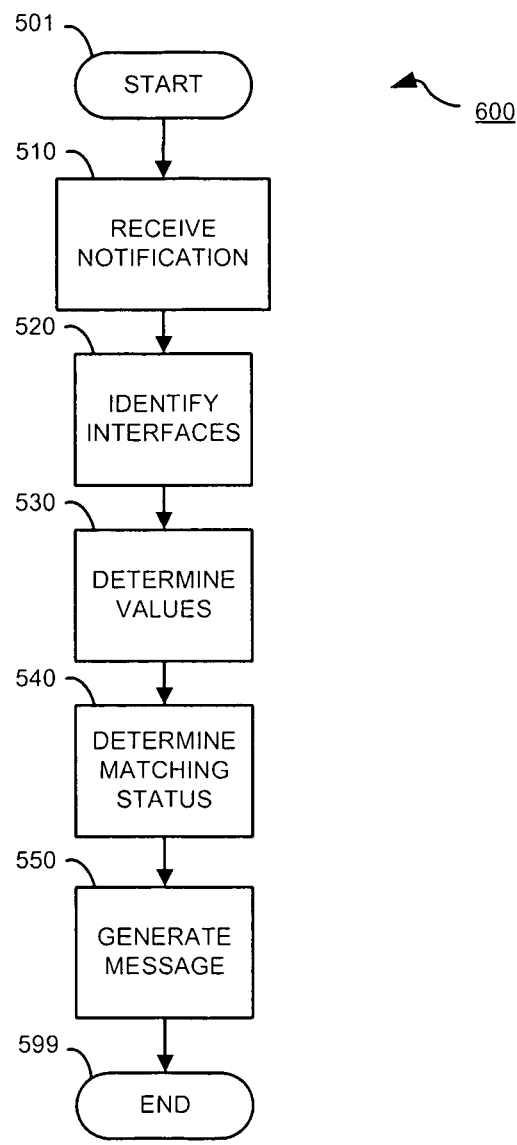
FIG. 6 is a flow chart of a simplified exemplary method for router misconfiguration diagnosis according to an further embodiment of the present invention.

FIG. 6 is a flow chart of a simplified exemplary method 600 for router misconfiguration diagnosis according to a further embodiment of the present invention. It should be noted that FIG. 6 includes blocks having identical reference numbers to corresponding blocks shown in FIG. 5. Such blocks represent steps of method 600 that correspond to steps of method 500.

The method 600 begins at start block 501, and proceeds to block 510. At block 510, a notification 330 of a routing failure 331 (e.g., lost adjacency) between a first node 311 and a second node 312 is received.

At block 520, a first interface 155 associated with the first node 311 is identified, and a second interface 155 associated with the second node 312 is identified.

At block 530, a first management information value 420 and a second management information value 420, specific to a routing protocol, are determined. For example, SNMP queries may be used to retrieve the relevant set of management information values 420 from a MIB 400 associated with router 150.

At block 540, matching status is determined between the first management information value 420 and the second management information value 420. For example, a mismatch may be identified between the two management information values 420, or a match may be identified.

At block 550, a diagnostic message is generated responsive to the notification. For example, in some embodiments, a tool (such as webappmon) can be used to invoke a diagnostic script, to capture the standard output of its results, and to display the output as a web page to the user. The method 600 concludes at block 599.

Exemplary Interfaces

FIG. 7 shows an exemplary user interface 700 for management software 340 according to an embodiment of the invention. The user interface 700 displays a plurality of representations of alarms, each associated with a notification 330. Representation 710 is a representation of a selected alarm indicating "Lost Adjacency," and showing information derived from a notification 330 of lost adjacency between a source IP address 451 and a destination IP address 452.

Although exemplary implementations of the invention have been described in detail above, those skilled in the art will readily appreciate that many additional modifications are possible in the exemplary embodiments without materially departing from the novel teachings and advantages of the invention. Accordingly, these and all such modifications are intended to be included within the scope of this invention.

What is claimed is:

1. A method for router misconfiguration diagnosis, comprising:
    receiving a notification of a routing failure between a first node and a second node,
    identifying a first interface associated with the first node and a second interface associated with the second node,
    determining a first management information value associated with the first interface and a second management information value associated with the second interface, the first management information value and the second management information value being specific to a routing protocol, determining that the routing failure was caused by the first and second management information values being mismatched, and generating a diagnostic message responsive to the notification;

wherein the first management information value and the second management information value are selected from the group of variables consisting of ospfIfAdminStat, ospfIfAreaId, ospfIfType, ospfIfHelloInterval, and ospfIfRtrDeadInterval.

2. The method of claim 1 wherein the routing failure is lost adjacency.

3. The method of claim 1 further comprising
extracting from the notification a first IP address for the first node and a second IP address for the second node.

4. The method of claim 1 further comprising
receiving a user selection identifying the notification for diagnosis.

5. The method of claim 1 wherein identifying the first and second interfaces further comprises:
querying for a first interface index associated with the first node,
querying for a second interface index associated with the second node, and
saving the first and second interface index.

6. The method of claim 1 further comprising:
querying for a first interface status associated with the first interface,
querying for a second interface status associated with the second interface, and
saving the first and second interface statuses.

7. The method of claim 1 further comprising querying using a network management protocol.

8. The method of claim 7 wherein the network management protocol is SNMP.

9. The method of claim 1 wherein the routing protocol comprises OSPF.

10. The method of claim 1 wherein the first management information value is selected from a first management information base associated with the first interface, and the second management information value is selected from a second management information base associated with the second interface.

11. The method of claim 10 wherein the first and second management information bases comprise OSPF interface tables.

12. The method of claim 1 further comprising displaying the diagnostic message.

13. The method of claim 1 wherein the diagnostic message comprises an error message returned from a network management protocol query.

14. The method of claim 1 wherein the diagnostic message comprises an indication of advice to check for an event indicative of physical failure.

15. The method of claim 1 wherein the diagnostic message comprises an indication that the routing protocol is disabled for an interface associated with at least one of the first and second nodes.

16. The method of claim 1 wherein the diagnostic message comprises the first management information value and the second management information value.

17. The method of claim 1 wherein the diagnostic message comprises an indication of a router misconfiguration.

18. The method of claim 1 wherein the diagnostic message comprises identification of a mismatch between the first management information value and the second management information value.

19. A system for router misconfiguration diagnosis in a communications network, comprising:
a management station able to receive from a routing analyzer a notification of a routing failure between a first node of the communications network and a second node of the communications network,
the management station being adapted to identify a first interface associated with the first node and a second interface associated with the second node, to determine a first management information value associated with the first interface and a second management information value associated with the second interface, the first management information value and the second management information value being specific to a routing protocol, to determine that the routing failure was caused by the first and second management information values being mismatched, and to generate a diagnostic message responsive to the notification;
wherein the first management information value and the second management information value are selected from the group of variables consisting of ospfIfAdminStat, ospfIfAreaId, ospfIfType, ospfIfHelloInterval, and ospfIfRtrDeadInterval.

20. The system of claim 19 wherein the routing failure is lost adjacency.

21. The system of claim 19 wherein the notification comprises a first IP address for the first node and a second IP address for the second node.

22. The system of claim 19 wherein the management station is further adapted to receive a user selection identifying the notification for diagnosis.

23. The system of claim 19 wherein the first management information value is selected from a first management information base associated with the first interface, and the second management information value is selected from a second management information base associated with the second interface.

24. A non-transitory computer-readable medium comprising storage and a set of instructions located on the storage, for router misconfiguration diagnosis, which when the instructions are executed by a computer, cause the computer to perform a process comprising:
receiving a notification of a routing failure between a first node and a second node,
identifying a first interface associated with the first node and a second interface associated with the second node,
determining a first management information value associated with the first interface and a second management information value associated with the second interface, the first management information value and the second management information value being specific to a routing protocol,
determining that the routing failure was caused by the first and second management information values being mismatched, and
generating a diagnostic message responsive to the notification;
wherein the first management information value and the second management information value are selected from the group of variables consisting of ospfIfAdminStat, ospfIfAreaId, ospfIfType, ospfIfHelloInterval, and ospfIfRtrDeadInterval.

25. The computer-readable medium of claim 24 wherein the routing failure is lost adjacency.

26. The computer-readable medium of claim 24, wherein the set of instructions further comprises steps for:

extracting from the notification a first IP address for the first node and a second IP address for the second node.

27. The computer-readable medium of claim 24, wherein the set of instructions further comprises steps for:
receiving a user selection identifying the notification for diagnosis.

28. The computer-readable medium of claim 24, wherein identifying the first and second interfaces further comprises:
querying for a first interface index associated with the first node,
querying for a second interface index associated with the second node, and
saving the first and second interface index.

29. A system for router misconfiguration diagnosis, comprising:
a computing environment arranged to receive a notification of a routing failure between a first node and a second node,
a computing system operatively associated with the computing environment for identifying a first interface associated with the first node and a second interface associated with the second node,
a computing application operatively associated with the computing system for determining a first management information value associated with the first interface and a second management information value associated with the second interface, the first management information value and the second management information value being specific to a routing protocol, and for determining that the routing failure was caused by the first and second management information values being mismatched, and
a message generator operatively associated with the computing system for generating a diagnostic message responsive to the notification,
wherein the first management information value and the second management information value are selected from the group of variables consisting of ospfIfAdminStat, ospfIfAreaId, ospfIfType, ospfIfHelloInterval, and ospfIfRtrDeadInterval.

30. The method of claim 1, wherein the first management information value comprises an entry in an OSPF interface table.

31. The method of claim 1, wherein the first management information value comprises an administrative status for the first interface.

* * * * *

UNITED STATES PATENT AND TRADEMARK OFFICE
CERTIFICATE OF CORRECTION

PATENT NO. : 8,467,301 B2  
APPLICATION NO. : 11/446914  
DATED : June 18, 2013  
INVENTOR(S) : Kam C. Wong et al.

Page 1 of 1

It is certified that error appears in the above-identified patent and that said Letters Patent is hereby corrected as shown below:

In the Claims

In column 11, lines 8-10, in Claim 1, delete "ospfIfAdminStat, ospfIfAreaId, ospfIfType, ospfIfHelloInterval, and ospfifRtrDeadInterval." and  
insert - - ospfIfAdminStat, ospfIfAreaId, ospfIfType, ospfIfHelloInterval, and ospfIfRtrDeadInterval. - -, therefor.

In column 12, lines 22-24, in Claim 19, delete "ospfIfAdminStat, ospfIfAreaId, ospfIfType, ospfIfHelloInterval, and ospfIfRtrDeadInterval." and  
insert - - ospfIfAdminStat, ospfIfAreaId, ospfIfType, ospfIfHelloInterval, and ospfIfRtrDeadInterval. - -, therefor.

In column 12, lines 61-63, in Claim 24, delete "ospfIfAdminStat, ospfIfAreaId, ospfIfType, ospfifHelloInterval, and ospfIfRtrDeadInterval." and  
insert - - ospfIfAdminStat, ospfIfAreaId, ospfIfType, ospfIfHelloInterval, and ospfIfRtrDeadInterval. - -, therefor.

In column 14, line 10, in Claim 29, delete "notification," and insert - - notification; - -, therefor.

In column 14, lines 14-16, in Claim 29, delete "ospfIfAdminStat, ospfIfAreaId, ospfIfType, ospfIfHelloInterval, and ospfIfRtrDeadInterval." and  
insert - - ospfIfAdminStat, ospfIfAreaId, ospfIfType, ospfIfHelloInterval, and ospfIfRtrDeadInterval. - -, therefor.

Signed and Sealed this  
Twenty-ninth Day of October, 2013

Teresa Stanek Rea  
*Deputy Director of the United States Patent and Trademark Office*